(12) United States Patent
Gall

(10) Patent No.: US 10,375,239 B1
(45) Date of Patent: Aug. 6, 2019

(54) AGENT DIRECTED DIALING SYSTEM AND METHOD OF USE

(71) Applicant: Erik Gall, Grants Pass, OR (US)

(72) Inventor: Erik Gall, Grants Pass, OR (US)

( * ) Notice: Subject to any disclaimer, the term of this patent is extended or adjusted under 35 U.S.C. 154(b) by 0 days.

(21) Appl. No.: 16/100,577

(22) Filed: Aug. 10, 2018

(51) Int. Cl.
*H04M 3/51* (2006.01)
*H04M 3/523* (2006.01)

(52) U.S. Cl.
CPC ....... *H04M 3/5158* (2013.01); *H04M 3/5175* (2013.01); *H04M 3/5183* (2013.01); *H04M 3/523* (2013.01)

(58) Field of Classification Search
CPC ...... H04M 3/51; H04M 3/5183; H04M 3/523; H04M 3/5233; H04M 2203/402
USPC ........... 379/265.02, 265.05, 265.11, 265.12, 379/265.06, 265.07, 265.01, 265.14
See application file for complete search history.

(56) References Cited

U.S. PATENT DOCUMENTS

| | | | |
|---|---|---|---|
| 6,650,748 B1 * | 11/2003 | Edwards | H04M 3/523 379/265.01 |
| 2012/0084111 A1 * | 4/2012 | Aggarwal | G06Q 10/06311 705/7.14 |

* cited by examiner

*Primary Examiner* — Thjuan K Addy
(74) *Attorney, Agent, or Firm* — Eldredge Law Firm; Richard Eldredge

(57) ABSTRACT

An agent directed dialing system prompts a user to initiate calls and that the number of calls is determined by a control module. The progress of active calls are monitored and additional calls are transferred to agents deemed able to handle multiple calls at once. The system ensures that a minimum or no calls are dropped because agents are not available to take the calls.

4 Claims, 5 Drawing Sheets

AGENT DIRECTED DIALING SYSTEM AND METHOD OF USE

BACKGROUND

1. Field of the Invention

The present invention relates generally to outbound calling systems, and more specifically, to systems for improving the efficiency and productivity of those persons tasked with completing the calls.

2. Description of Related Art

Outbound calling systems are well known in the art and are effective means to contact potential clients or others with whom a conversation is desired. For example, FIG. 1 depicts a conventional outbound calling system 101 having a dialer that initiates calls 103 and when a call is answered 104, the dialer transfers the call to an agent 105, if no agents are available the dialer drops the call 107. When an agent completes a call 109 agents are sent back to await a new call from the dialer.

One of the problems commonly associated with system 101 is limited use. For example, regulations and best practices direct that a call must be originated by an agent or other living person.

Accordingly, although great strides have been made in the area of out bound calling systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
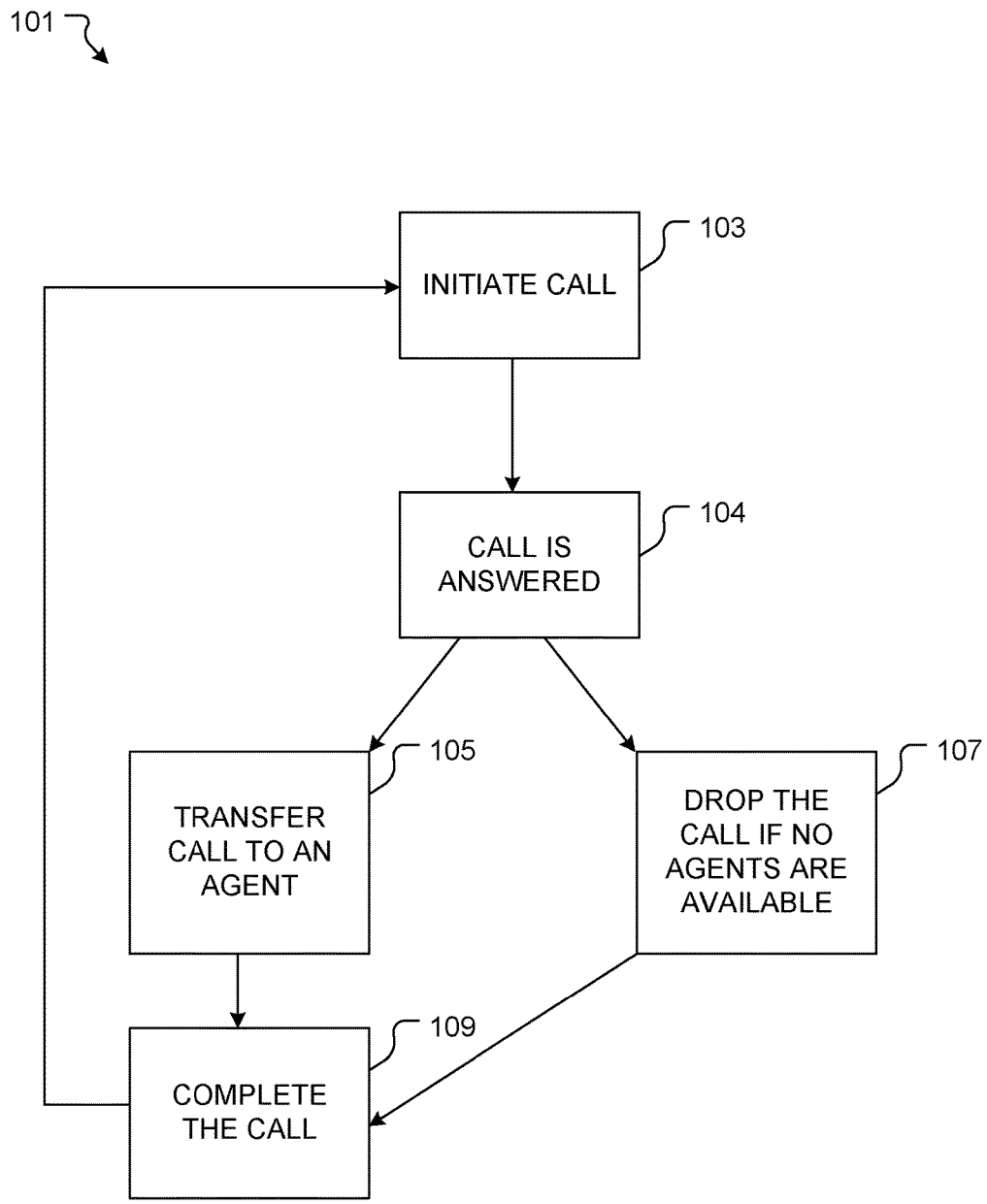
FIG. 1 is a diagram of a common outbound calling system.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional outbound calling systems. Specifically, the invention of the present application enables agent initiated outbound calls. In addition, the invention manages the efficiency of the agents and maximizes their efforts. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
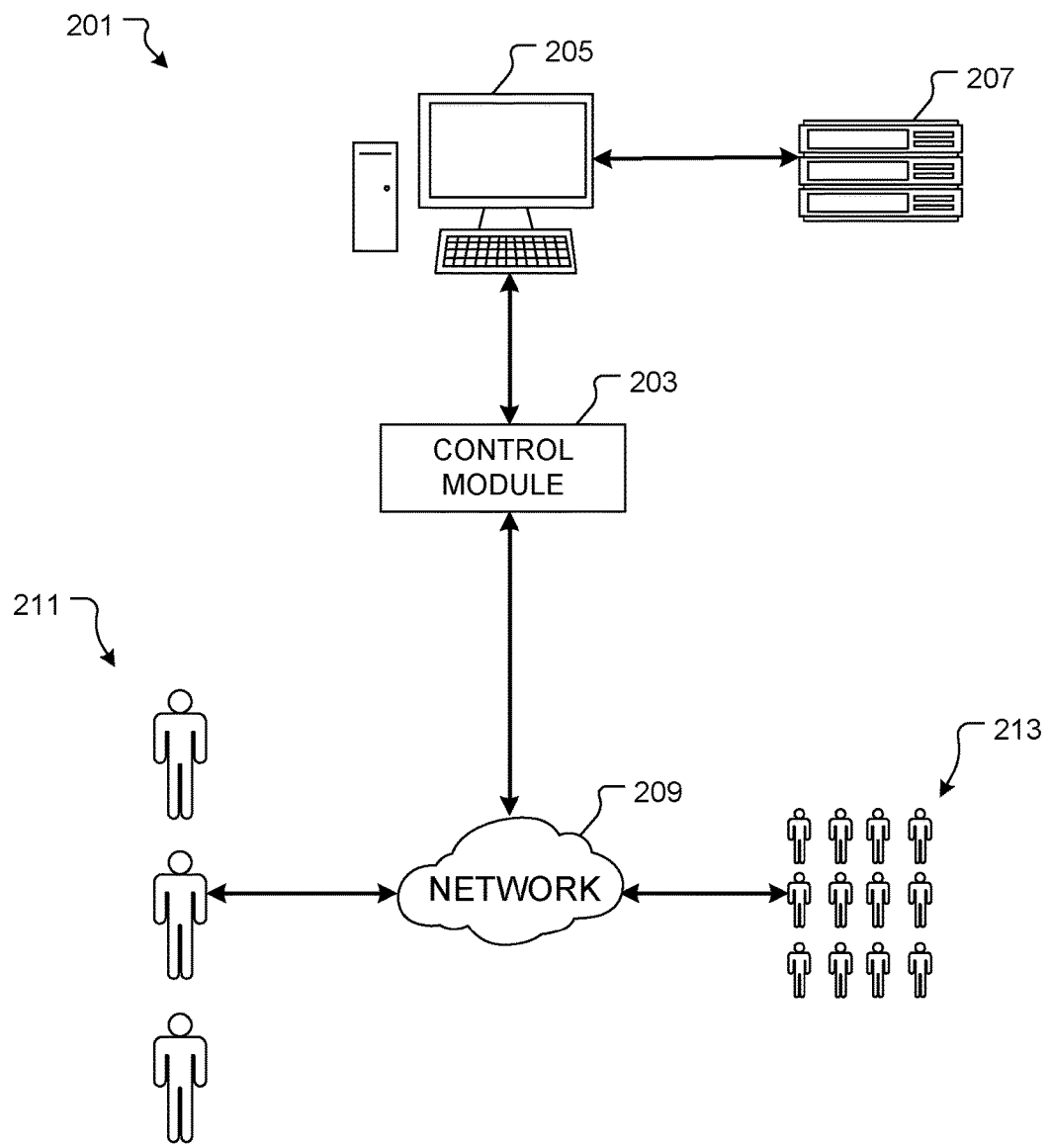
FIG. 2 is a diagram of an agent directed dialing system in accordance with a preferred embodiment of the present application.

Referring now to the drawings wherein like reference characters identify corresponding or similar elements throughout the several views, FIG. 2 depicts a diagram of an agent directed dialing system in accordance with a preferred embodiment of the present application. It will be appreciated that system 201 overcomes one or more of the above-listed problems commonly associated with conventional outbound calling systems.

In the contemplated embodiment, system 201 includes a control module 203 running on a CPU 205 having a database 207. The control module 203 in communication with agents 211 and people 213 via a network 209. It is contemplated that any user, person or the like interacting with the control module 203 is considered an agent 211 for this disclosure e.g. a supervisor or administrator.

Figure 3:
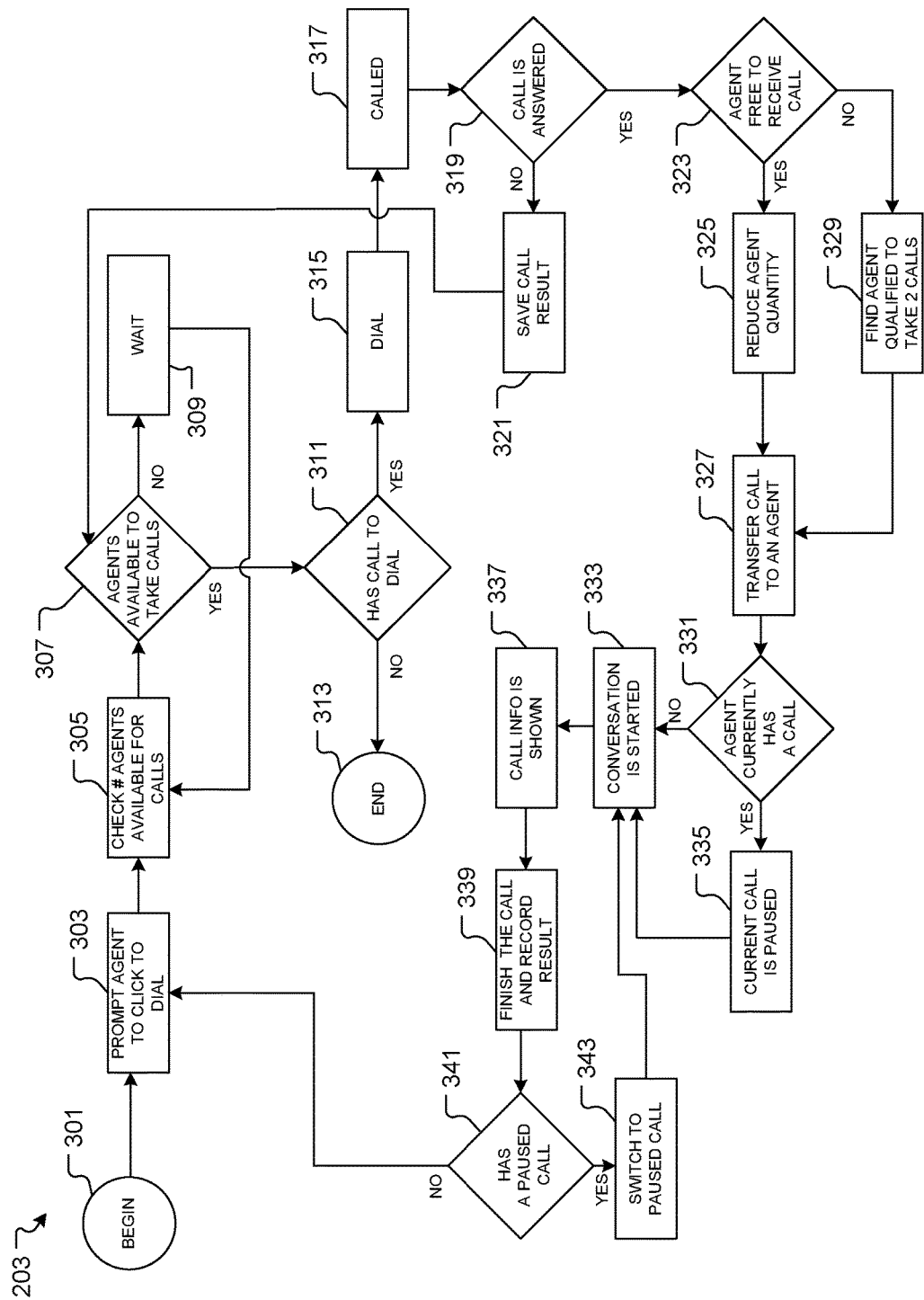
FIG. 3 is a flowchart of the preferred configuration of the control module of FIG. 2.
Figure 4:
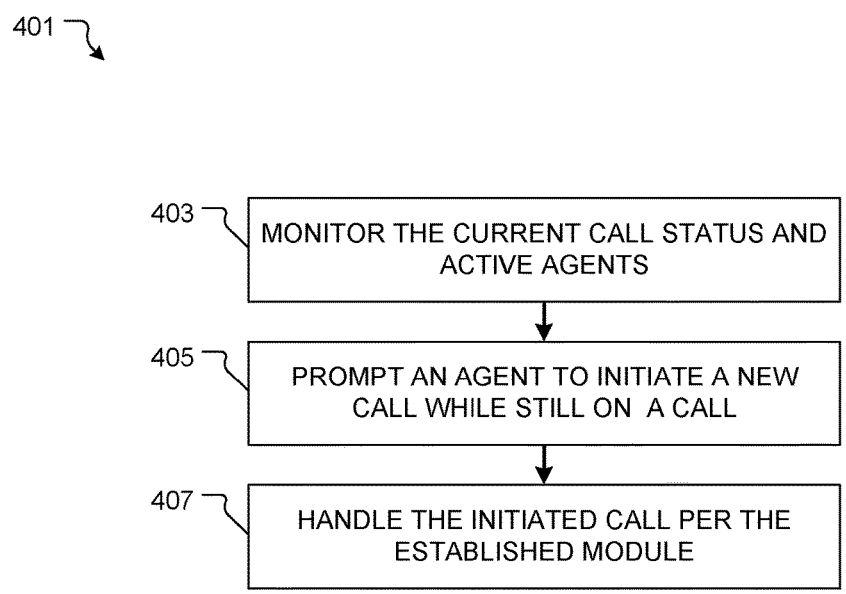
FIG. 4 is a flow chart of an alternative feature for a control module.

The control module 203 enabling the agents to convey information or inquiries to the people 213 as depicted by FIG. 3. Control module 203 including prompting an agent who becomes active in the module 203 to click a button or the like to initiate a call 303. It is contemplated that while the agent initiates a call 303 that the module could select the intended recipient or other aspects of the call but that the module 203 is acting as directed by the agent when the call was initiated.

When the module 203 establishes that agents are available and that calls are initiated the call is allowed to be placed and a response awaited (see 305, 307, 311, 315, 317 and 319). It is contemplated that if agents are in the module 203 but occupied therein, the system 201 will wait 309 until at least one agent is available before allowing calls to be made. It is further contemplated that if for any reason no agents are available and the module 203 of the system 201 is active that it will shut down 313. If a call ends and no answer is obtained it is recorded 321 and the line becomes available for another call.

When a call is answered the module determines which agent should take the call, and if all agents are on a call then the new answered call is routed to an agent qualified to handle multiple calls (see 323, 325, 327, 329, 331, 333 and 335). When a call with a person is connected to an agent the module 203 displays the information about the call 337 to the agent, this could include prompts, personal information or the like. When a call is completed and the results are recorded 339 if the agent has another call on hold 341 they are returned thereto 343 or the module prompts the agent to click to dial a new call 303.

It is contemplated and will be appreciated that the module 203 could utilize additional methods or algorithms could be used such as to determine how many calls are initiated by each click an agent makes or how many calls to concurrently allow.

It should be appreciated that one of the unique features believed characteristic of the present application is that an agent 311 initiates calls.

In an alternative embodiment 401 the control module 203 includes the ability to monitor the status of the agents in calls 403 and determine the probability of needing to add an additional call or calls and prompting an agent to initiate the additional calls 405. These new additional calls are handled 407 according to the control module 203 wherein this embodiment functions.

It will be understood that capabilities common in the art such as automatic dialing could be implemented in any of the embodiments without deviating from the intent thereof.

Figure 5:
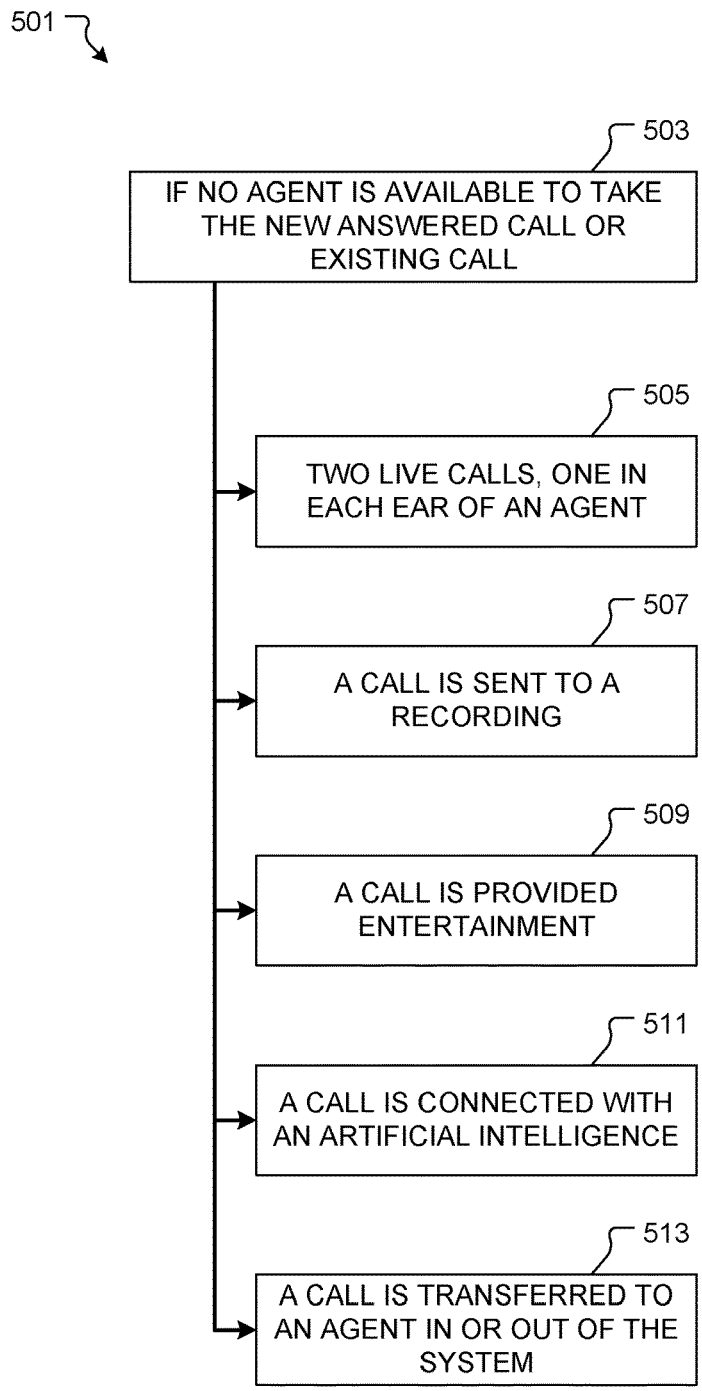
FIG. 5 is a flow chart of a method associated with the present invention.

It is contemplated and is depicted by FIG. 5 that should no agent be free to handle a call that is answered 503 other options exist than those depicted by FIG. 3. Alternative embodiments 501 of these options include enabling an agent to handle two simultaneous calls where one call is placed in a first ear phone and another call is placed in a second ear phone 505. It will be appreciated that the agent could switch their communication between calls.

Additional embodiments 501 include connecting the answered call or an existing call with a pre-recorded message 507 or provided a form of entertainment 509 such as music, a game or the like. Another embodiment 501 includes connecting either the new or existing call with an artificial intelligence 511 that could communicate a message, require input and take action based on the input received. Another embodiment 501 for handling a call with no available agents is that either the new call or an existing call could be transferred to another agent inside of the system or outside thereof 513. While these embodiments 501 are provided they are not intended as exhaustive or limiting in the action the module can take when a call is answered.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed:

1. A method of controlling placement of new calls within a call center, the method comprising:
   monitoring a call status of a plurality of active agents, the plurality of active agents being determined as being active based on being in communication with a control module, regardless of whether each of the plurality of active agents is engaged in a call;
   prompting one of the plurality of active agents to initiate a new call while the one of the plurality of active agents is still on a call through the control module associated with a CPU;
   receiving initiation of the new call from the one of the plurality of active agents clicking a button in communication with the control module;
   initiating the new call from the control module associated with the CPU and a network; and
   determining an available agent to accept an answered call resulting from the initiating of the new call;
   wherein the determining of an available agent is based on data determined by the control module; and
   wherein the data includes whether each of the plurality of active agents are currently engaged in calls and whether each of the plurality of active agents are qualified to take multiple calls at a time.

2. The method of claim 1, further comprising:
   pausing the answered call based on the control module determining an absence of an available agent.

3. The method of claim 1, further comprising:
   providing entertainment to the answered call upon determining an absence of an available agent.

4. The method of claim 1, further comprising:
   facilitating a switch between a current call and the answered call to allow for a single agent to handle multiple calls.

* * * * *